(12) United States Patent
Okubo et al.

(10) Patent No.: US 9,136,788 B2
(45) Date of Patent: Sep. 15, 2015

(54) MOTOR CONTROLLER, AIR COMPRESSOR, AIR CONDITIONER, CONTROLLER OF PASSENGER CONVEYOR AND CONTROLLER OF CONVEYOR

(75) Inventors: Tomofumi Okubo, Narashino (JP); Norinaga Suzuki, Katori (JP); Hajime Uematsu, Narashino (JP); Hideharu Tanaka, Shizuoka (JP); Masakazu Hase, Shizuoka (JP); Yoshiyuki Taguchi, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 1167 days.

(21) Appl. No.: 12/935,526

(22) PCT Filed: Feb. 16, 2009

(86) PCT No.: PCT/JP2009/052500
§ 371 (c)(1),
(2), (4) Date: Nov. 8, 2010

(87) PCT Pub. No.: WO2009/122784
PCT Pub. Date: Oct. 8, 2009

(65) Prior Publication Data
US 2011/0056226 A1 Mar. 10, 2011

(30) Foreign Application Priority Data
Mar. 31, 2008 (JP) ................................. 2008-089125

(51) Int. Cl.
*F04B 49/06* (2006.01)
*H02P 21/00* (2006.01)
(Continued)

(52) U.S. Cl.
CPC ............ *H02P 21/0039* (2013.01); *F04C 28/06* (2013.01); *H02P 21/0032* (2013.01); *H02P 29/0088* (2013.01); *B60L 2240/36* (2013.01); *Y02T 10/643* (2013.01)

(58) Field of Classification Search
CPC ............ H02P 21/0032; H02P 29/0088; H02P 21/0039; B60L 2240/36; Y02T 10/643; F04C 28/06; F04C 29/02; F04C 2270/051; F04C 2270/075; F04C 2270/19; F04B 49/02; F04B 49/065; F04B 2203/0201; F04B 2203/021
USPC ........... 417/13; 318/400.09, 400.11, 430, 431
See application file for complete search history.

(56) References Cited

U.S. PATENT DOCUMENTS 3,414,522 A * 12/1968 Hoekstra ......................... 516/98
5,012,652 A * 5/1991 Dudley .......................... 62/192
(Continued)

FOREIGN PATENT DOCUMENTS

JP  5-19201 A   1/1993
JP  6-288215 A  10/1994
(Continued)

OTHER PUBLICATIONS

Machine Translation of foreign Publication No. JP 2007085360 A; dated Apr. 2007; Name: Aoki,Masakazu et al.*
Japanese Office Action with partial English translation dated Jun. 12, 2012 (three (3) pages).
International Search Report dated May 19, 2009 (Two (2) pages).

*Primary Examiner* — Peter J Bertheaud
*Assistant Examiner* — Dnyanesh Kasture
(74) *Attorney, Agent, or Firm* — Crowell & Moring LLP (57) ABSTRACT

Disclosed is a motor control apparatus for controlling a synchronous motor, which includes a receiver section for receiving the value detected by a temperature sensor installed inside the synchronous motor. The synchronous motor is started up with the current fed into it, whose magnitude is changed in accordance with the temperature received by the receiver section at the time of starting up the synchronous motor. In this way, the stable startup of the synchronous motor can be guaranteed and the useful life of the semiconductor elements can also be prolonged.

4 Claims, 7 Drawing Sheets

(51) Int. Cl.
  *F04C 28/06*  (2006.01)
  *H02P 29/00*  (2006.01)

(56) References Cited

U.S. PATENT DOCUMENTS

| | | | |
|---|---|---|---|
| 5,959,428 A | 9/1999 | Saito et al. | |
| 7,019,480 B2* | 3/2006 | Suzuki et al. | 318/400.08 |
| 7,619,385 B2* | 11/2009 | Suzuki et al. | 318/705 |
| 2003/0017054 A1 | 1/2003 | Odachi et al. | |
| 2006/0120876 A1* | 6/2006 | Kitano et al. | 417/42 |
| 2007/0024232 A1 | 2/2007 | Suzuki et al. | |
| 2007/0084214 A1* | 4/2007 | Schmidt et al. | 60/778 |
| 2010/0278660 A1* | 11/2010 | Burchill et al. | 417/53 |

FOREIGN PATENT DOCUMENTS

| | | |
|---|---|---|
| JP | 10-311611 A | 11/1998 |
| JP | 2001-339981 A | 12/2001 |
| JP | 2003-28073 A | 1/2003 |
| JP | 2004-123348 A | 4/2004 |
| JP | 2006-166658 A | 6/2006 |
| JP | 2007-37352 A | 2/2007 |
| JP | 2007-85360 A | 4/2007 |
| JP | 2007085360 A * | 4/2007 |

* cited by examiner

MOTOR CONTROLLER, AIR COMPRESSOR, AIR CONDITIONER, CONTROLLER OF PASSENGER CONVEYOR AND CONTROLLER OF CONVEYOR

INCORPORATION BY REFERENCE

This application claims priority based on Japanese Patent Application No. 2008-089125 filed on Mar. 31, 2008, the content of which is hereby incorporated by reference thereto.

TECHNICAL FIELD

This invention relates to a technique for controlling an electric motor, and more particularly to a control technique for starting up an electric motor.

BACKGROUND ART

In the case where a predetermined rotational speed as a control command value is given to a synchronous motor so that a compressor can be driven by controlling the synchronous motor, the attempt to start driving the synchronous motor in accordance with the command value results in a large torque and may sometimes cause the desynchronization of the synchronous motor. JP-A-2003-28073 discloses a technique capable of stably starting up a compressor which has a piston and compresses refrigerant, by discharging the liquefied refrigerant out of the piston chamber.

JP-A-2006-166658 discloses a technique capable of stably starting up a gas compressor which was shut down last time with its piston at a predetermined position.

Patent Document 1: JP-A-2003-28073
Patent Document 2: JP-A-2006-166658

DISCLOSURE OF INVENTION

Problem to be Solved by the Invention

In order to prevent the step out (i.e. desynchronization) of a synchronous motor at the time of its startup, it is necessarily to generate a torque large enough to overcome the load torque required at the time of startup. For this purpose, it is necessary to start up the synchronous motor by forcing a large startup current through the synchronous motor. However, with this method of causing the synchronous motor to drawl a large current at its startup, heavy loads are imposed on the semiconductor elements (e.g. IGBTs) that generate the startup current through their switching control. As a result, the useful life of the semiconductor elements is unfavorably shortened. Despite this fact, there has hitherto been proposed any technique that takes this problem into account.

For example, in the case where a synchronous motor is used to drive an air compressor, a situation sometimes arises wherein an unusually large torque is needed to start up the air compressor. This situation occurs when air compression is performed while lubrication oil is being supplied into the compression chamber. Since the viscosity of the lubrication oil increases when its temperature is lowered, the required startup torque becomes large when the compressor is started up in a low-temperature surroundings.

Conventionally, the permanent magnet synchronous motor was caused to draw a large current for its ensured start-up, that is, in order to cope with the situation in which a large startup torque is required. Consequently, a problem was incurred that the useful life of the semiconductor switching elements was shortened.

On the other hand, if an attempt is made to start up the permanent magnet synchronous motor with a small current, that is, when the generated torque is insufficient, the protective function begins to work to cut off the supply of power to the motor so that the air compressor fails to be started up. In such a case, there's a need for the maintenance work for restarting the air compressor and therefore the reliability of operation degrades.

One object of this invention, which proposes a solution to the above described problem, is to provide a motor control apparatus which can prolong the useful life of the semiconductor switching elements and which can stably start up a synchronous motor.

Another object of this invention is to stably start up such a machine as an air compressor that is driven by a synchronous motor, and therefore to improve the reliability of operation.

Means for Solving the Problem

In order to solve the problem as described above, this invention is so constructed as defined in the attached claims.

For example, there is provided a motor control apparatus for controlling a synchronous motor by controlling the current fed into the synchronous motor, the motor control apparatus including a receiver section for receiving the value detected by a temperature sensor installed inside the synchronous motor, wherein the current fed into the synchronous motor at the time of startup, is changed in response to the temperature received by the receiver section.

According to the above mode of practice of this invention, it is preferable that the magnitude of the current fed into the synchronous motor at the time of startup should be larger as the temperature lowers.

Further, it is preferable that the synchronous motor should be started up by causing DC current to flow through a given phase winding of the armature windings incorporated in the synchronous motor.

According to another mode of practice of this invention, there is provided an air compressor comprising a compressor main body for compressing air; a synchronous motor for driving the compressor main body; a motor control section for controlling the rotational speed of the synchronous motor; and an oil supply section for supplying oil to the compressed air, the air compressor including a temperature sensor for detecting the temperature of oil, and the air compressor being started up by changing the magnitude of the current fed into the synchronous motor by the motor control section in accordance with the temperature detected by the temperature sensor at the time of the startup of the compressor main body.

In the above described mode of practice, it is preferable that the compressor should be started up with a 1st startup current when the temperature detected at the time of the startup of the compressor main body is equal to or lower than a preset temperature, and with a 2nd startup current smaller than the 1st startup current when the detected temperature is higher than the preset temperature.

Further, it is preferable that the startup current should be set smaller as the detected temperature becomes higher.

Furthermore, the temperature sensor should preferably be installed inside the synchronous motor.

According to yet another mode of practice of this invention, there is provided an air conditioner having a refrigerating cycle in which the refrigerant is circulated, comprising a compressor for compressing the refrigerant; a synchronous motor for driving the compressor; a motor control section for controlling the rotational speed of the synchronous motor; and a temperature sensor for detecting the temperature of the refrigerant, the air conditioner being started up by changing the magnitude of the current fed into the synchronous motor by the motor control section in accordance with the temperature detected by the temperature sensor at the time of startup.

In the above described mode of practice, the air conditioner further comprises a pressure sensor for detecting the pressure of the refrigerant, and the air conditioner is started up with the current fed into the synchronous motor the magnitude of which is changed by the motor control section in accordance with the detected temperature and the detected pressure.

According to still another mode to practice of this invention, there is provided a control apparatus for a passenger conveyor comprising plural steps which are arranged on a belt in the form of a loop and circulated endlessly; balustrades which move in synchronism with the steps; a synchronous motor which drives the steps and the balustrades; and a motor control section which controls the rotational speed of the synchronous motor, the control apparatus further comprising a detector for detecting the total weight of passengers to be carried and the passenger conveyor being started up with the current whose magnitude is changed by the motor control section in accordance with the detected total weight.

According to the above mode of practice of this invention, it is preferable that the passenger conveyor should be started up with a larger startup current as the detected total weight increases.

According to still another mode of practice of this invention, there is provided a control apparatus for a conveyor comprising plural rollers driven by a synchronous motor; a conveyor belt mechanically coupling the rollers; and a motor control section for controlling the rotational speed of the synchronous motor, wherein things to be transported on the conveyor belt are moved by rotating the rollers and therefore moving the conveyor belt, the conveyor control apparatus including a detector section for detecting the weight of things to be transported and the conveyor being started up with the startup current whose magnitude is changed by the motor control section in accordance with the weight detected at the time of starting up the conveyor.

According to the above mode of practice of this invention, it is preferable that the conveyor should be started up with a larger startup current as the detected weight is larger.

Advantages of the Invention

According to preferable modes of practice of this invention, there is provided a motor control apparatus the use of which can prolong the useful life of semiconductor elements.

Other objects and features of this invention will become apparent in the following description of the modes of practice of this invention.

Other objects, features and advantages of this invention will become apparent in the following description of the embodiments of this invention made with reference to the attached drawings.

BEST MODE FOR CARRYING OUT THE INVENTION

Embodiments of this invention will be described below with reference to the attached drawings.

In the following descriptions of embodiments, a permanent magnet synchronous motor is supposed to be used as an AC motor. However, this invention is not limited to the use of a permanent magnet synchronous motor, but other types of AC motors such as induction motors or reluctance motors may be used for achieving the same purpose.

Embodiment 1

Figure 1:
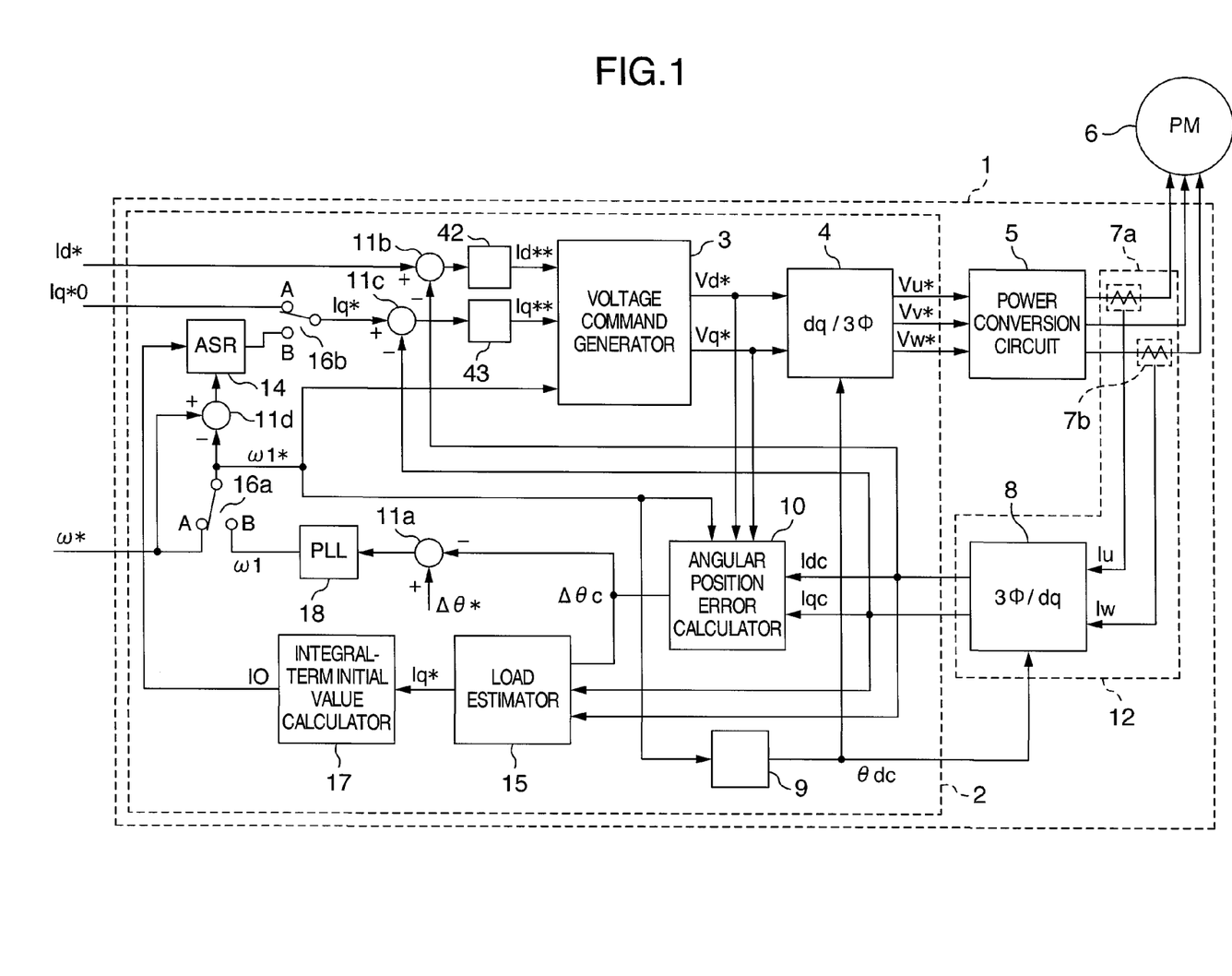
FIG. 1 shows in block diagram the structure of a control system for a synchronous motor as a first embodiment of this invention.

A motor control apparatus as a first embodiment of this invention will be described below with reference to FIG. 1. FIG. 1 shows in block diagram the structure of an AC motor driving system in the first mode of practice of this invention.

Shown in this structure are a permanent magnet three-phase synchronous motor 6, and a motor control system 1 incorporating therein a power conversion circuit 5, for controlling the drive of the permanent three-phase synchronous motor 6. The motor control system 1 estimates the angular position of the rotor of the synchronous motor 6 and controls the rotational speed of the motor 6, that is, performs the so-called, position-sensor-free control. In such a position-sensor-free control, since the angular position of the motor cannot be determined unless the motor is rotated, it is impossible to know beforehand how to supply current to the motor so as to start up the motor.

Accordingly, in this embodiment, it is essential to start up and control the permanent magnet synchronous motor according to the method described below. The detail of such a control will be described later, but here is given a brief description covering the start-up through the position-sensor-free control.

Figure 2:
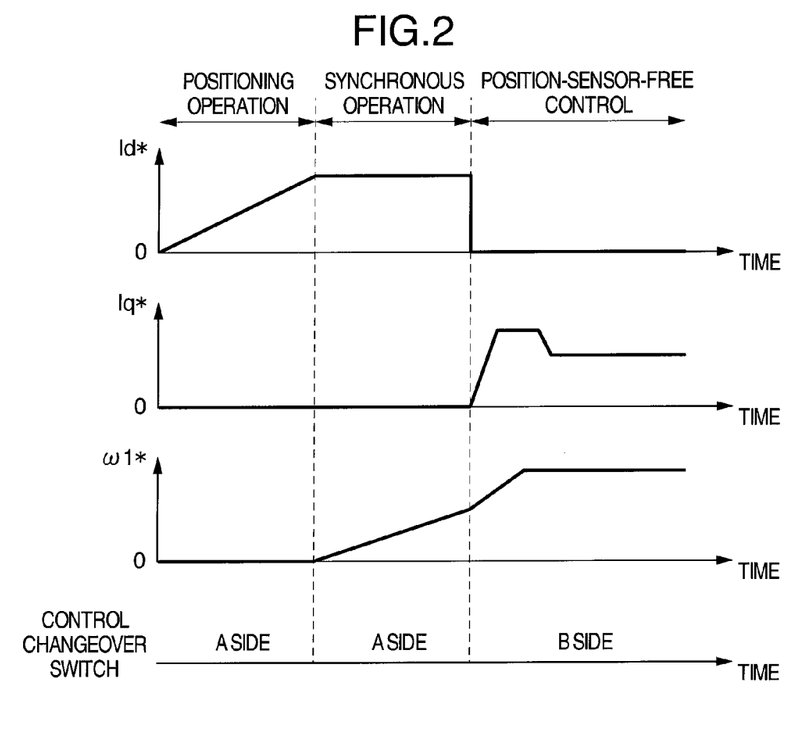
FIG. 2 illustrates the change with time of the operation of the synchronous motor in the first embodiment, from the time the synchronous motor is started up to the time the sensor-free control takes place.

As shown in FIG. 2, the startup of the synchronous motor 6 takes place as a positioning operation wherein a current whose magnitude is gradually increasing is fed through the rotor winding of an arbitrary phase so as to fix the rotor of the motor 6 at a certain angular position. Consequently, the rotor can be rotated to a predetermined angular position. After the startup through the positioning operation, a synchronous operation wherein the voltage to be applied to the permanent magnet synchronous motor 6 is determined in accordance with the d-axis current command value Id*, the q-axis current command value Iq* and the frequency command value ω*, is performed until the rotational speed which can stabilize the position-sensor-free control, is reached. Subsequent to this synchronous operation, which increased the rotational speed up to a predetermined value, the position-sensor-free control is performed wherein the inverter frequency command value ω1* is adjusted so that the shaft angular position error Δθ$_c$ may vanish.

In order to start up the permanent magnet synchronous motor through a positioning operation, a startup current is fed into the permanent magnet synchronous motor in response to the control command issued by the motor control system 1. The permanent magnet synchronous motor may sometimes step out (i.e. desynchronize), when the startup torque becomes too large for some cause. It is difficult to detect such desynchronization. However, whenever the startup torque increases, excessive current tends to flow. Therefore, this embodiment utilizes this phenomenon, that is, when the excessive current is detected, the synchronous motor is shut down and protected from getting broken. The excessive current is judged to have been detected depending on the value of the motor current I which is determined on the basis of the d-axis detection current Idc and the q-axis detection current Iqc. The motor current I is given by the following expression:

$$I=\sqrt{(Idc^2+Iqc^2)}$$

When the motor current I exceeds a predetermined value (e.g. 420 A), it is judged that the excessive current due to overload has arisen. Accordingly, the protective function begins to work so that the output from the power conversion circuit is interrupted.

That value of the motor current I which corresponds to the occurrence of the excessive current, is determined depending on, for example, the withstand voltage of the power module. The motor control system is designed in such a manner that the particular value mentioned above is not reached in the normal operation. That is to say, control is performed below the current value equal to 80% of that particular value.

However, when the protective function works, such a maintenance work as a restarting operation is necessary with the result that the reliability of operation degrades. It is therefore required to control the permanent magnet synchronous motor so as not to activate the protective function. In order to surely start up the motor without activating the protective function, it is necessary to cause a large startup current enough to cope with the increased startup torque to flow into the permanent magnet synchronous motor.

The current that flows into the permanent magnet synchronous motor is generated by the power conversion circuit 5. The power conversion circuit 5 includes a driver circuit for power devices such as power controlling MOSFETs or insulated gate bipolar transistors (IGBTs), and a power module incorporating therein a self-protection function. The current fed into the permanent magnet synchronous motor is generated by turning on/off the power devices.

The useful life of an IGBT will now be explained. The IGBT performs the switching of current through it, and the current generates heat, which causes the temperature of the switching element to rise. The repeated heat generation causes mechanical stress repeatedly in the junction points between the components of the power module such as, for example, the intervening solder layer between the IGBT and the insulating material and the intervening solder layer between the insulating material and the metal base. The repeated application of stress on the solder layers creates microcracks in the solder layers, which gives rise to a problem.

This problem is ascribed to the fact that the materials (e.g. ceramics, copper, silicon, etc.) constituting the power module have different thermal expansion coefficients, which, when temperature rises, generate mechanical stresses in the solder layers. The microcracks in the solder layers prevent the dissipation of heat generated by the semiconductor element. The repeated temperature elevation increases the number and sizes of the microcracks. Accordingly, as the operation of the semiconductor element continues, the temperatures at the junctions may possibly rise gradually until the temperatures exceed a threshold above which the semiconductor element is broken down. The useful life of the semiconductor element defined by the number of repeated switching operations is referred to hereafter as the "power cycle life".

Figure 3:
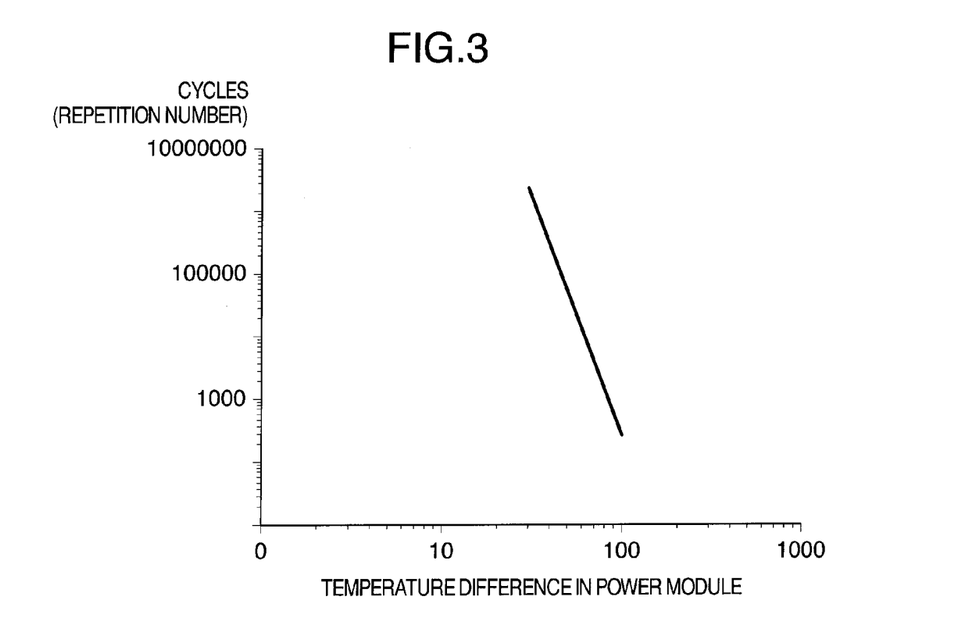
FIG. 3 illustrates the power cycle life of semiconductor elements used in the first embodiment.

Now, the power cycle life of an ordinary IGBT will be explained with reference to FIG. 3. FIG. 3 graphically shows an example of the characteristic that the power cycle life of the IGBT varies inversely as the temperature change ΔTj at junctions. Accordingly, the larger is the temperature change ΔTj, the smaller is the number of the tolerable repetition of operation, this meaning that the power cycle life is shortened.

This embodiment aims to improve the reliability of operation through the extension of the power cycle life by diminishing the temperature change ΔTj. To achieve this objective, the permanent magnet synchronous motor is started up with a small startup current when the required torque at startup is small. This way of startup is adopted in consideration of the fact that the power cycle life is shortened if the startup takes place with a current large enough to start up the motor even in case that the load torque is considered to be maximum. By starting up the motor with a small current, the temperature change ΔTj can be limited to small values so that the power cycle life can be prolonged.

A concrete method for startup will be explained in the case where an air compressor is driven by a permanent magnet synchronous motor. Most of air compressors rated at about 5 kW through 200 kW, which are widely used for industrial applications, are of screw type. In this embodiment, the air compressor of screw type is described as employed.

Figure 4:
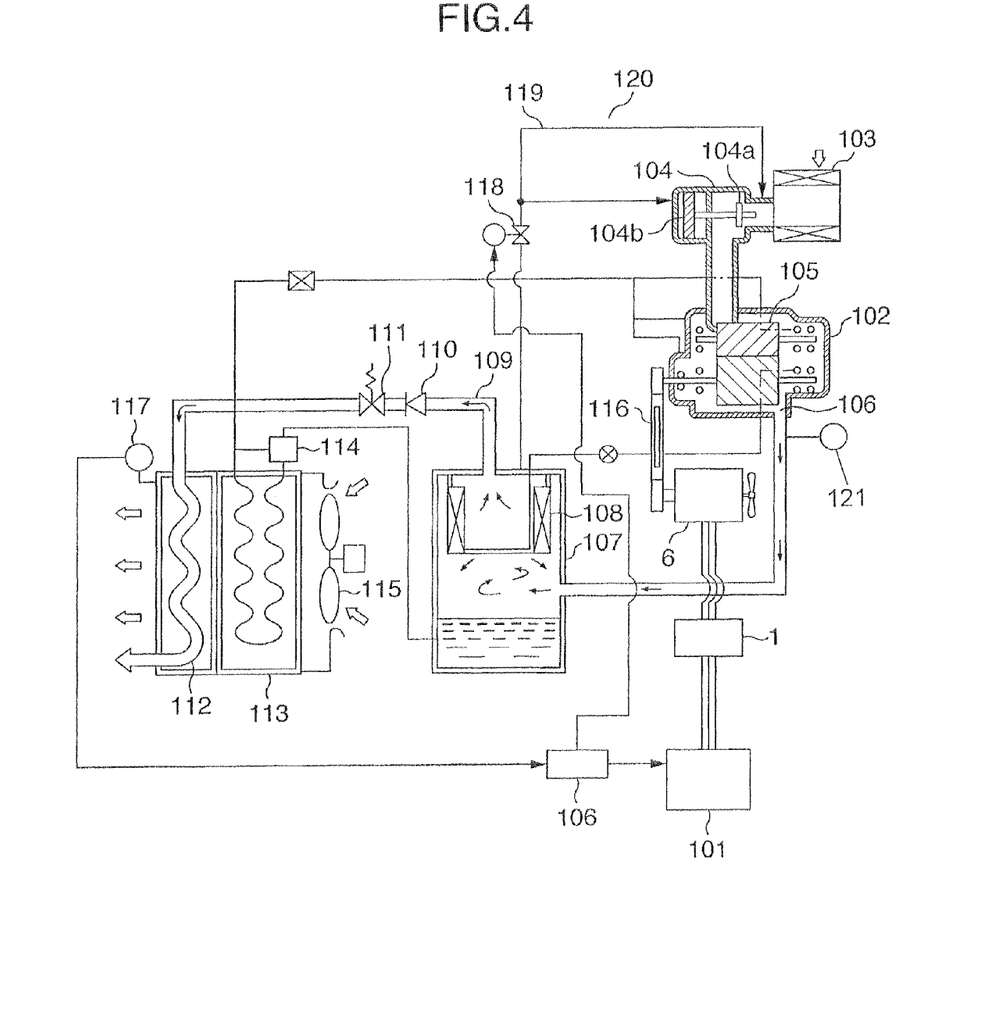
FIG. 4 schematically shows the structure of an air compressor according to the first embodiment.

FIG. 4 schematically shows the structure of an air compressor according to this embodiment. When the air compressor is started up, an air compressor control section 101 outputs a control command to the motor control system 1. Then, the output signal of the motor control system 1 starts up the permanent magnet synchronous motor 6. In other words, the current out of the power conversion circuit 5 shown in FIG. 1 flows into the permanent magnet synchronous motor 6 so that the permanent magnet synchronous motor 6 is started up. As a result, the air compressor main body 102 is driven. The operation of the air compressor will now be described.

Air sucked through an intake filter 103 is passed through an intake choke valve 104, compressed between rotors 105 in the air compressor main body 102, and discharged at a discharge opening 106. To cool off the heat generated due to air compression and to provide lubrication and sealing, lubrication oil is charged into the rotor section 105 of the air compressor main body 102. Compressed air discharged together with the lubrication oil at the discharge opening 106 flows into an oil separator tank 107. An oil separating element 108 separate the compressed air from the lubrication oil. The separated pressurized air flows into an after-cooler 112 via a discharging pipe 109, a check valve 110 and a pressure control valve 111; is cool off in this after-cooler 112; and then discharged into an external apparatus not shown.

On the other hand, the lubrication oil is separated from the compressed air in the oil separator tank 107 and led out of the bottom of the oil separated tank 107 into an oil cooler 113. That part of the lubrication oil which has been passed through the oil cooler 113 and therefore cooled off and that part of the lubrication oil which is not passed through the oil cooler 113 and therefore not cooled, are mixed up in a temperature adjusting valve 114. And the mixed lubrication oil lubricates the air compressor main body 102. The after-cooler 112 and the oil cooler 113 are cooled off with the cooling wind generated by a cooling fan 115.

The shaft of the rotor 105 of the compressor main body 102 is mechanically coupled to the shaft of the permanent magnet synchronous motor 6 by means of a belt 116. The permanent magnet synchronous motor 6 is controlled by the command issued by the motor control system 1 and can be operated at variable speeds. Downstream of the check valve 110 is equipped a pressure sensor 117, which detects the pressure of the fluid discharged out of the air compressor main body 102. The signal output of this pressure sensor 117 is sent to an input/output section 106. The air compressor control section 101 includes a memory and a PID function, compares the pressure detected by the pressure sensor 117 with the preset pressure stored in the memory, outputs to the motor control system 1 such a frequency as causes the detected pressure to become equal to the target pressure P0, and changes the rotational speed of the permanent magnet synchronous motor 6.

The valve plate 104a of the intake choke valve 104 located upstream of the compressor main body 102 is driven in the closing direction when the piston 104b receives pressure from on the side of an electromagnetic valve 118. In other words, when the electromagnetic valve 118 opens, the high pressure in the oil separator 108 is conducted into the intake choke 104 valve so that the pressure is applied to the piston 104b. Further, part of the air in the oil separated 108 is released via a discharge pipe 119 to the intake side of the intake choke valve 104 when the electromagnetic valve 118 opens. At this time, the flow rate of the discharged air is controlled by an orifice 120. Alternatively, however, the part of the air may be released out of the air compressor main body 102, instead of being conducted into the discharge pipe 119.

Now, description is made of a cause for the startup torque of the air compressor increasing.

Figure 5:
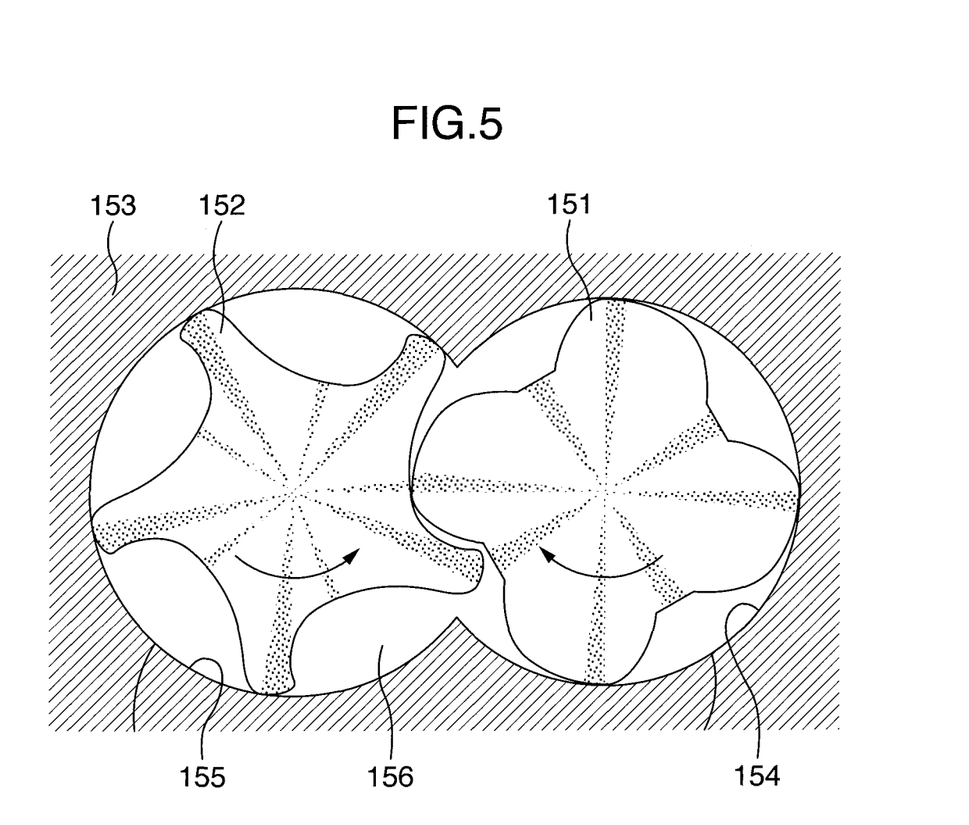
FIG. 5 illustrates the structure of the pressurizing chamber of the air compressor in the first embodiment.

FIG. 5 shows the structure of the air compressor main body 102 of screw type. This figure is a cross-section taken perpendicular to the rotary shaft of the rotor. As shown in FIG. 5, a male rotor 151 and a female rotor 152 are rotatably received in hollow cylinders in a casing 153, the hollow cylinders sharing their hollow spaces partially. They rotate with their teeth engaged with each other. The two hollow cylinders form a pressurizing chamber 156 consisting of a male rotor side wall surface 154 and a female rotor side wall surface 155. The volume of the pressurizing chamber 156 increases and decreases as the rotors rotate. In the process of volume increasing, air is sucked into the pressurizing chamber 156. In the process of volume decreasing, the pressurizing timber 156 is kept closed until the internal pressure of the sucked air reaches a predetermined value, and the discharge port is located at the position where the pressurized air should be discharged thereafter.

As described above, in the air compressor of this employment, lubrication oil is fed into the pressurizing chamber 156, and the lubrication oil and the air confined in the pressurizing chamber 156 are pressurized together (referred to as oil cooling method or oil supply method). According to this method, the outer peripheral gaps serving as the inner leaking channels are filled with lubrication oil to reduce internal leaking and therefore to improve the energy efficiency of the air compressor. However, when the air compressor is shut down after having been operated, a small amount of lubrication oil may remain in the pressurizing chamber and adhere onto the surfaces of the rotors. The increase in the startup torque may sometimes be attributed to this remnant lubrication oil adhering to the rotor surfaces. This mechanism will be described below.

Figure 6A:
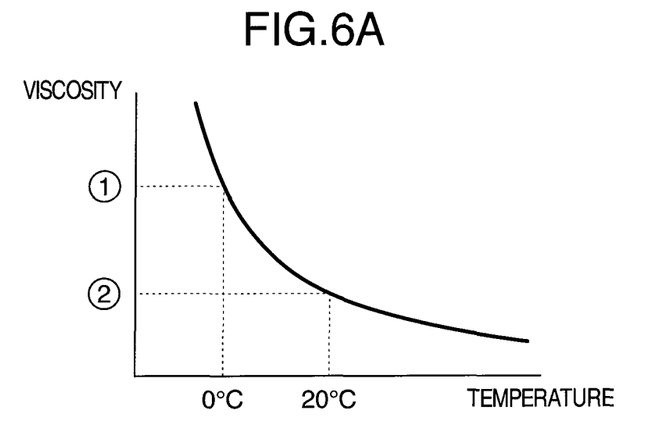
FIG. 6A illustrates the relationship between the temperature and viscosity, of the lubrication oil in the first embodiment.
Figure 6B:
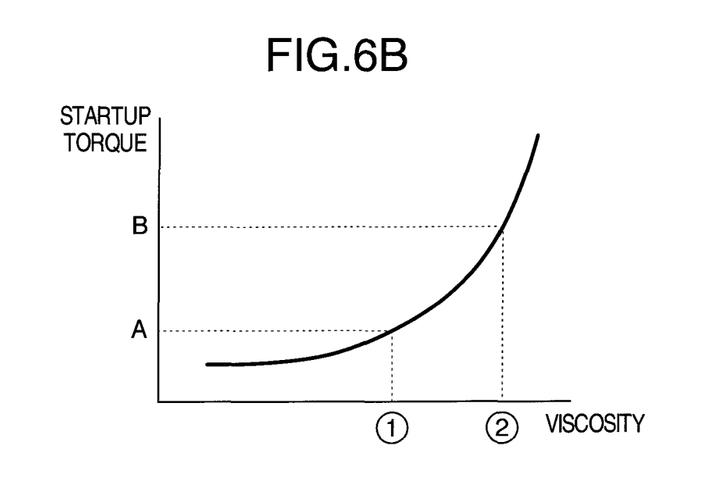
FIG. 6B illustrates the relationship between the temperature of the lubrication oil and the startup torque in the first embodiment.

In general, lubrication oil has the characteristic that its viscosity increases as its temperature lowers, as graphically shown in FIG. 6A. Accordingly, if the air compressor is shut down after lubrication oil has been completely circulated throughout the compressor main body 102, and subsequently left in a place of low temperature, then the temperature of the lubrication oil lowers and its viscosity increases. And as shown in FIG. 6B, the startup torque increases as the viscosity increases. If the air compressor is restarted in such a case where highly viscous lubricating oil adhered to the rotor surfaces, the startup torque increases as compared with the normal startup case. This is why the startup torque of the air compressor becomes large. The increased startup torque makes an overload, which prevents the permanent magnet synchronous motor 6 from being started up. The failure of startup then gives rise to an excessive current, which activates the protective function to cause the motor to halt.

In this embodiment, as described above, the permanent magnet synchronous motor is started up with a small startup current when the required startup torque is small. How this startup is performed will be concretely described below.

Since it is usually difficult to determine the torque required for the startup of a permanent magnet synchronous motor, the startup of the permanent magnet synchronous motor was conventionally executed by feeding to the motor a current large enough to startup the motor under any possible condition whatever. Specifically in the case where the position-sensor-free control is executed, it is essential to increase the rotational speed of the permanent magnet synchronous motor up to a predetermined value. Therefore, it is mandatory to make a secure startup to provide a satisfactory control.

However, according to this conventional method, although the permanent magnet synchronous motor can always be started up, a problem still remains that the power cycle life becomes shortened. According to this embodiment, therefore, the extension of the power cycle life of the IGBT is contrived by starting up the motor with a small current when the required startup torque is small. How to determine such a startup torque as required will be described below.

As described above, when the temperature of lubrication oil lowers, its viscosity increases so that the required startup torque also increases. On the other hand, since the viscosity of lubrication oil decreases when its temperature rises, the required startup torque decreases. In fact, it is not necessarily required to feed a large current into the permanent magnet synchronous motor for its startup in the surroundings of moderately high or normal temperatures, except in the early morning on a cold winter day.

According to this embodiment, attention has been paid to the fact that the startup torque varies as the temperature of lubrication oil changes. In this embodiment, the temperature of lubrication oil is detected, and the magnitude of the startup current to be fed into the permanent magnet synchronous motor can be changed in accordance with the detected value of temperature. The temperature of lubrication oil is detected by a temperature sensor installed in the pressurizing chamber of the air compressor. The detected value of temperature is sent, along with the startup command values, to the motor control system. The motor control system determines the magnitude of the startup current in accordance with the received value of temperature and then starts up the permanent magnet synchronous motor. According to this embodiment, since the startup takes place with a relatively small current if the detected temperature has a high value, then the power cycle life of the IGBT can be prolonged.

Alternatively, the temperature of lubrication oil may be detected by a temperature sensor disposed on the discharging side of the compressor main body, such as the temperature sensor 121 shown as disposed on the discharging side of the compressor main body 102 in FIG. 4, or a temperature sensor disposed on the motor. In other words, the value of temperature of the lubrication oil can be estimated from the value of temperature detected by a temperature sensor disposed on the motor since the motor to drive the compressor main body is usually coupled thereto directly or disposed in the vicinity thereof. In such a case, when the command values are sent from the air compressor control section to the motor control system, the motor is started up after the motor control system has determined the startup current in accordance with the value of the temperature detected by the temperature sensor.

Regarding the way of determining the startup current, the magnitude of the startup current is changed in reference to a predetermined temperature (e.g. 5° C.). In fact, the motor is started up with a startup current of 300 A fed into the motor when the temperature of lubrication oil is at 5° C. or lower, or with a startup current of 200 A fed into the motor when the temperature of lubrication oil exceed 5° C. The reference temperature, with respect to which the magnitude of the startup current is changed, is not necessarily set at a fixed value. Since the torque required for startup decreases as the viscosity of lubricating oil decreases, it is considered that the power cycle life can be prolonged if the value of the reference temperature is set higher. According to the conventional method, a very large current was fed into the motor for its fail-free startup. As compared with this conventional method, according to this embodiment, the motor can be started up with a smaller current so that the useful life of IGBTs can be prolonged and also that the reliability of operation can be improved.

The detail of controlling the permanent magnet synchronous motor will be described below.

The motor control system 1 performs the vector control on the dc-qc plane of rotating coordinate system, consisting of the dc-axis indicating the direction of the exciting current within the motor control system 1 (i.e. the direction of magnetic flux) and the qc-axis indicating the direction of torque current. The functional components of the motor control system 1 are implemented by hardware such as a CPU (central processing unit), a memory, etc. and software such as programs executed by a computer.

Now, components constituting a control section 2 will be described below.

A voltage command value generator 3 performs a vector calculation according to the following expressions (1) by using the 2nd current command values Id and Iq for the d- and q-axes, the inverter frequency command value ω1*, and the motor constants, and then outputs Vd* and Vq*.

$$Vd^* = R \times Id^{**} - \omega 1^* \times Lq \times Iq^{**}$$
$$Vq^* = R \times Iq^{**} + \omega 1^* \times Ld \times Id^{**} + \omega 1^* \times Ke \quad (1)$$

In the above expression (1), R denotes the electric resistance of the primary winding of the permanent magnet synchronous motor 6, Ld denotes the inductance with respect to the d-axis, Lq denotes the inductance with respect to the q-axis, and Ke denotes the constant of the induced voltage.

An angular position error calculator 10 calculates an angular position error Δθc by using the current Idc detected for the d-axis (i.e. the d-axis detection current), and the current Iqc detected for the q-axis (the q-axis detection current), and Vd* and Vq* output from the voltage command value generator 3. The angular position error Δθc is then subtracted from the predetermined angular position error command value Δθ* (normally equal to zero) in a subtractor 11a. The result of subtraction, i.e. the difference, is subjected to the proportional-integral control in a PLL controller 13 to produce a detected frequency ω1. In the position-sensor-free control described later, the detected frequency ω1 is used as an inverter frequency command value ω1*, and the angular position of a given magnetic pole of the permanent magnet synchronous motor can be estimated by integrating the inverter frequency command value ω1* in an integrator 9. The estimated angular position θdc of the particular magnetic pole is inputted into a dq/3φ converter 4 and a 3φ/dq converter 8 and used for calculations in the respective converters 4 and 8.

In other words, in the control section 2 of this embodiment, the angular position error Δθc between the actual angular position of the rotor of the permanent magnet synchronous motor and the angular position of control is calculated; the inverter frequency command value ω1* is corrected by using the PLL (phase locked loop) process in such a manner that the calculated angular position error Δθc vanishes, that is, the angular position of control coincides with the actual angular position of the rotor of the permanent magnet synchronous motor; and the angular position of the magnetic pole is estimated.

Now, the structures of current controllers 42, 43 will be described below.

Figure 7:
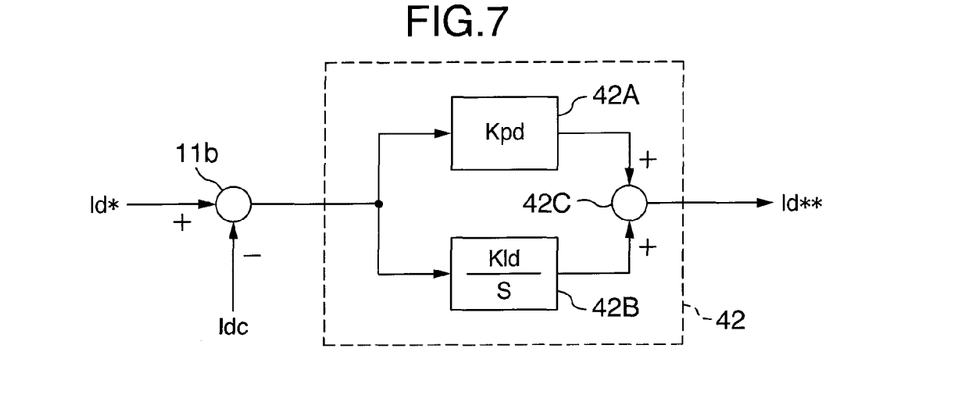
FIG. 7 shows an example of the d-axis current controller in the first embodiment.

FIG. 7 shows in block diagram the structure of the d-axis current controller 42. A subtractor 11b calculates the difference between the d-axis current command value Id* and the detected value Idc for the d-axis, both being supplied, for example, form the upstream devices. The calculated difference is multiplied, on one hand, by a proportional gain Kpd in a proportional calculator 42A. On the other hand, the same difference is multiplied by an integral gain Kid and then integrated in an integral calculator 42B. The outputs of the proportional calculator 42A and the integral calculator 42B are added together, and the added amount yields the 2nd d-axis current command value Id**. This calculation process is represented by the following expression (2).

$$Id^{**} = (Id^* - Idc) \times (Kpd + Kid/S) \quad (2)$$

Figure 8:
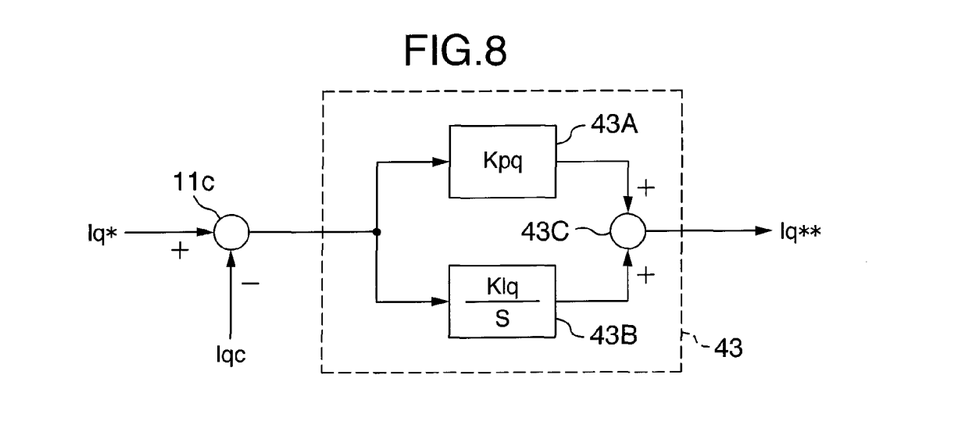
FIG. 8 shows an example of the q-axis current controller in the first embodiment.

FIG. 8 shows in block diagram the structure of the q-axis current controller 43. A subtractor 11c calculates the difference between the q-axis current command value Iq* and the detected value Iqc for the q-axis, both being supplied, for example, form an upstream devices or the former being supplied from a speed controller 14. The calculated difference is multiplied, on one hand, by a proportional gain Kpq in a proportional calculator 43A. On the other hand, the same difference is multiplied by an integral gain Kiq and then integrated in an integral calculator 43B. The outputs of the proportional calculator 43A and the integral calculator 43B are added together, and the added amount yields the 2nd q-axis current command value Iq**. This calculation process is represented by the following expression (3).

$$Iq^{**} = (Iq^* - Iqc) \times (Kpq + Kiq/S) \quad (3)$$

Figure 9:
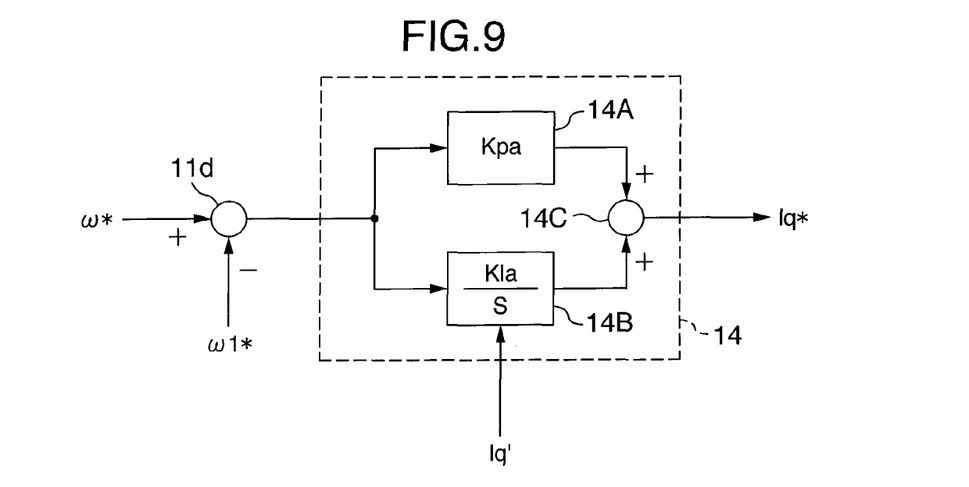
FIG. 9 shows an example of the speed controller in the first embodiment.

Further, FIG. 9 shows in block diagram the structure of the speed controller 14. When a control changeover switch 16a selects the stationary contact B, a subtractor 11d calculates the difference between the frequency command value ω* output from, for example, an upstream device and the inverter frequency command value ω1* from the PLL process. The calculated difference is multiplied, on one hand, by a proportional gain Kpa in a proportional calculator 14A. On the other hand, the same difference is multiplied by an integral gain Kia and then integrated in an integral calculator 14B. The outputs of the proportional calculator 14A and the integral calculator 14B are added together, and the added amount yields the q-axis current command value Iq*. This calculation process is represented by the following expression (4).

$$Iq^* = (\omega^* - \omega 1^*) \times (Kpa + Kia/S) \quad (4)$$

In this embodiment where the position-sensor-free control is performed, when the permanent magnet synchronous motor is started up, the positioning operation is first performed in which both the control changeover switches 16a and 16b select the stationary contacts A. In fact, the frequency command value ω* is used as the inverter frequency command value ω1*, and the q-axis current command value Iq*0 supplied from an external device such as, for example, an upstream controller is used as Iq*. In order to feed current into the permanent magnet synchronous motor 6, the inverter frequency command value ω1* is set to zero.

After the positioning operation has finished, a synchronous operation is started. Both the movable contacts of the control changeover switches 16a and 16b remain on the stationary contact A. In the synchronous operation, the inverter frequency command value ω1* is increased while the d-axis current command value Id* is kept constant (this way of startup is referred to as Id startup). Accordingly, the permanent magnet synchronous motor is accelerated following up the inverter frequency command value ω1*.

At the time point when the position-sensor-free control becomes available, the movable contacts of the control changeover switches 16a and 16b select the stationary contacts B so that the position-sensor-free control is started. Consequently, the PLL controller 18 adjusts the frequency command value ω* in such a manner that the difference between the angular position error Δθc and the angular position error command value Δθ* (equal to zero, generally) vanishes, and the speed controller 14 adjusts the q-axis current command value Iq* in such a manner that the difference between the frequency command value ω* and the inverter frequency command value ω1* vanishes. Since Iq* becomes equal to the value corresponding to the accelerating torque plus the load torque, the permanent magnet synchronous motor 6 is accelerated. Thereafter, acceleration ceases and when the speed becomes constant, Iq* becomes constant at the value corresponding to the load torque. It is to be noted that the d-axis current command value Id* is set to zero during the position-sensor-free control since the permanent magnet synchronous motor employed in this embodiment is assumed to be of non-salient pole type.

Embodiment 2

A motor control apparatus according to the 2nd embodiment of this invention will be described below with reference to the attached drawings.
This embodiment is based on the idea basically identical with that of the 1st embodiment described above, and directed to decreasing the startup current for a permanent magnet synchronous motor. In the 1st embodiment, description was made regarding the case where the permanent magnet synchronous motor drives the air compressor. However, this idea of starting up the permanent magnet synchronous motor can also be applied to any other case where it is used to drive other devices or apparatuses.

Here, description is made of a case where the permanent magnet synchronous motor is used to drive an electric compressor installed in an air conditioner or an electric refrigerator. The electric compressor installed in the air-conditioner performs the so-called refrigerating cycle that is executed by circulating the refrigerant by the rotational force of the permanent magnet synchronous motor.
In other words, heat is transferred by compressing and expanding the refrigerant gas while circulating it. Such a gas as can be easily liquefied like, for example, chlorofluorocarbon gas is used as the refrigerant.

When the electric compressor is left unused for a long time, the refrigerant that was in the form of gas during the operation of the electric compressor may sometimes liquefy and remain in the compressor. If the electric compressor is started up in such a situation, the permanent magnet synchronous motor must generate a large torque. Accordingly, the motor is started up with a large current in such a situation, but otherwise the motor can be started up with a small current.

It is possible to determine whether or not a large startup torque is required in an air conditioner, on the basis of the detected values of the temperature and pressure of the refrigerant. This is because the state of the refrigerant remaining in the electric compressor can be identified from the detected values. It is also possible to determine whether or not a large startup torque is required, on the basis of the measurement of the time having elapsed since the last stop of operation. In fact, if a predetermined time has passed since the last stop of operation, it is judged that a large startup torque is required and that the motor should be started up with a large current. Consequently, it is possible to prolong the useful life of IGBTs and also to secure the smooth startup of the motor.

Further, this 2nd embodiment of the invention can also be applied to a conveyor which transports goods or commodities. The conveyor mentioned here means the mechanism wherein a wide looped belt is moved on rollers so that goods or commodities placed on the belt may be transported. The idea of the conveyor is adopted in the operating mechanism of an escalator, that is, the passenger conveyor is used to transport human beings.

Figure 10:
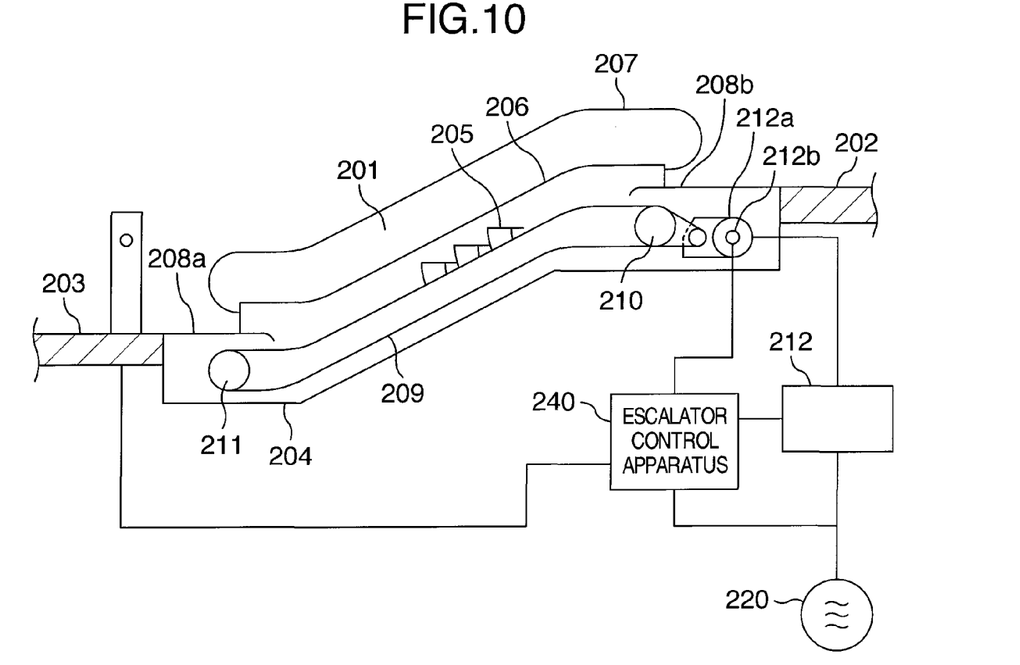
FIG. 10 schematically shows a control system for a passenger conveyor as a second embodiment of this invention.

FIG. 10 illustrates the entire structure of a passenger conveyor and its control apparatus. An escalator 201 comprises a frame body 204 built between an upper floor 202 and a lower floor 203; stairs on the upper surface of which steps (footsteps) 205 are provided; balustrades 206 disposed on either side of the stairs 205 in the moving direction thereof; moving handrails 207 that are moved under the guide of the balustrades 206; and a step-on platform 208a and a step-out platform 208b for getting on and off the stairs.

The steps 205 are attached to a stair chain 209 in an endless manner and circulated endlessly within the frame body 204. The stair chain 209 is wound around a driving sprocket 210 supported rotatably on a pivot provided at one lengthwise end of the frame body 204 and a follow-up sprocket 211 supported rotatably on a pivot provided at the other lengthwise end of the frame body 204. The driving sprocket 210 is driven by a motor control section 212 disposed nearby. The moving handrails 207 are also driven by the power supplied from the motor control section 212, in synchronism with the movement of the steps 205. This series of operations are performed by actuating a permanent magnet synchronous motor 212a by the motor control section 212.

The permanent magnet synchronous motor 212a is energized with power supplied from the commercial power source 220 via the motor control section 212. The motor control section 212 connected with the commercial power source 220 supplies power to the permanent magnet synchronous motor 212a and performs the variable speed control of the motor 212a, in response to the control signal output from an escalator control apparatus 240. In this way, the speed, acceleration and deceleration of the escalator 201 can be changed.

When the passenger conveyor is started up, the escalator control apparatus 240 outputs a startup command to the motor control section 212, and upon reception of the startup command, the motor control section 212 feeds a startup current to the permanent magnet synchronous motor 212a. At this time, the torque that the permanent magnet synchronous motor 212a must generate depends on the weight of people being conveyed on the passenger conveyor. That is to say, the magnitude of the required torque becomes larger as the weight on the passenger conveyor increases.

According to this embodiment, therefore, a detector (not shown) is provided to measure the overall weight of the people on the conveyor, and the startup current is changed in accordance with the measured weight. In fact, the larger is the weight, the larger is the startup current fed into the permanent magnet synchronous motor. Consequently, as compared with the startup in which a large current is supplied every time the motor is started up, the startup procedure according to this embodiment can save current very much at the time of startup, and therefore contribute to the prolongation of the useful life of IGBTs and further to the conservation of energy.

In this 2nd embodiment of the invention, the procedure of starting up the permanent magnet synchronous motor used for the passenger conveyor has been described, but it is apparent that the same procedure can be applied to the conveyor for carrying things. In the latter case, too, the same advantage can be obtained by changing the magnitude of the startup current in accordance with the overall weight of the things being carried by the conveyor.

Embodiment 3

The 3rd embodiment of this invention will be described below.

This third embodiment utilizes the automatic shutdown function so incorporated in an air compressor as to aim at energy conservation. Description is made of the automatic shutdown function below.

As shown in FIG. 4 illustrating the overall structure of the air compressor, the pressure sensor 117 for detecting the pressure of the discharged fluid is installed on the discharge side of the compressor main body. The output signal of the pressure sensor 117 is sent to the input/output section 106 and further to the air compressor control section 101. The air compressor control section 101 compares the detected pressure inputted thereto with the preset target pressure. Then, such a frequency as to make the detected pressure equal to the target pressure is supplied to the motor control system 1. In response to the frequency, the motor control system 1 controls the rotational speed of the permanent magnet synchronous motor 6. Accordingly, the required amount of air decreases with the result that the rotational speed of the compressor main body 102 can be lowered. In this embodiment, however, the control of the rotational speed does not take place over the entire range of the rated amount of discharged air, but takes place over 30%~100% of the entire range.

Figure 11:
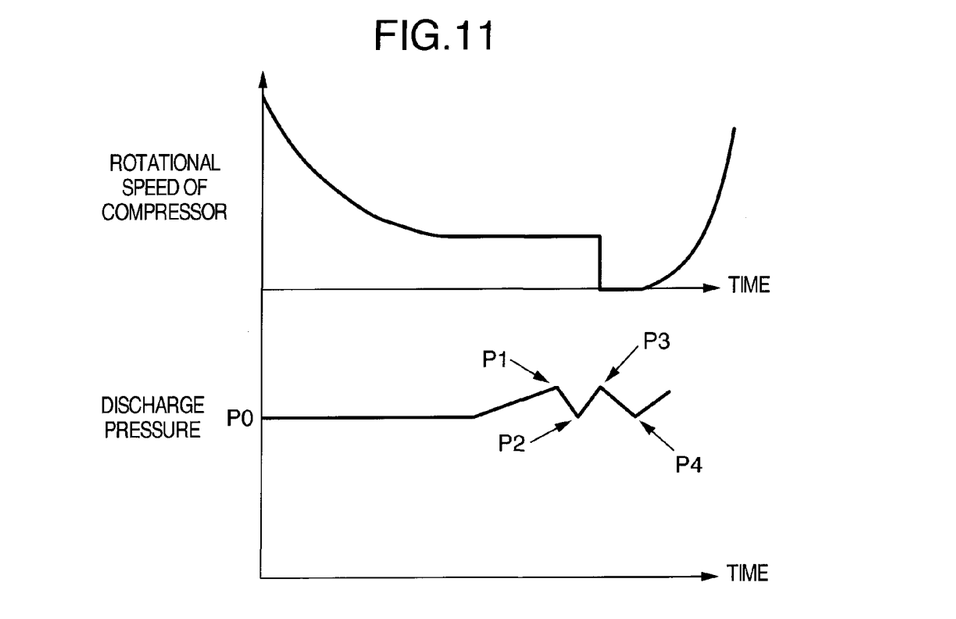
FIG. 11 illustrates the timing of shutdown/restart of an air compressor as a third embodiment of this embodiment.

FIG. 11 graphically shows the relationship between the rotational speed of the compressor main body and the discharge pressure of the discharged air, with respect to the control of the air compressor. As shown in FIG. 11, the target pressure is set at P0. When the operating range is reached where the discharged amount of air is less than or equal to 30% of the rated amount of discharged air and when the discharge pressure exceeds the preset pressure P1, the rotational speed of the compressor main body, namely of the permanent magnet synchronous motor is adjusted to and maintained at, the preset lower limit, and also the pressurized air discharged from the compressor main body is released into the atmosphere to performed the so-called no-load operation in which the discharged air is depressurized. The pressurized air is released by opening the release valve (e.g. electromagnetic valve) mounted on the discharge side of the compressor main body. As a result, the pressure at the discharge opening 106 of the compressor main body lowers to the value P2 so that the consumption of mechanical power can be decreased.

If the pressure starts to rise again at this time and exceeds the preset pressure P3, the pressure is lowered by shutting down the compressor main body. This mechanism of lowering pressure is referred to as the automatic shutdown function in this embodiment.

And if the pressure starts to lower and falls below the preset pressure P4, the compressor main body is restarted. This mechanism of restarting the compressor main body is referred to as the automatic restart function in this embodiment.

As described above, the air compressor goes through the repetitions of shutdown and restart for the purpose of energy conservation. This repetition takes place, for example, every five minutes in the mode of use in a factory facility where the air compressor is mounted. And in case of restarting the compressor main body, current must be fed into the permanent magnet synchronous motor, and therefore the power cycle life of IGBT is much influenced if restarting the motor takes place so often.

As described in the 1st embodiment, if the motor is always started up with a large current in anticipation of the case where the temperature of lubrication oil is low, the frequent repetitions of shutdown and restart cause large temperature changes in the junctions of IGBTs. This leads to the problem that the power cycle life is shortened.

This embodiment focused on the fact that if the air compressor is warmed up before being started up for a full-scale operation, the temperature of lubrication oil rises to a desired level at the time of restart. Therefore, the viscosity of lubrication oil becomes low enough at the time of restart due to the elevation of the temperature of lubrication oil. Accordingly, the required startup torque becomes small and the startup current can also be small. Even in the low-temperature surroundings, although a large startup torque is required at the time of the initial startup, the air compressor can be started up with a smaller startup current when it is restarted subsequent to the initial startup. Consequently, the temperature change $\Delta Tj$ in the junctions of IGBTs become small so that the power cycle life of IGBTs can be prolonged. Further, as compared with the conventional procedure which presupposes the supply of a large current each time the air compressor is started up, this embodiment can save much electric power and therefore provide the air compressor which can contribute much to energy conservation.

Moreover, according to this embodiment, when the air compressor is restarted, the temperature of lubrication oil becomes sufficiently high so that there's no need for a temperature sensor for detecting the temperature of lubrication oil. Hence, the reduction of cost can be realized. Without a temperature sensor, there's no risk of failure thereof and therefore no need for maintenance thereof, which contributes to startup without fail.

It is to be noted here that there's a possibility that the temperature of lubrication oil becomes unfavorably low if the time period is too long from the instant the automatic shutdown function of the air compressor starts to work to the instant the air compressor is restarted due to the activation of the automatic restart function. This embodiment can also cope with such a situation: under the normal condition, the air compressor is restarted with a startup current smaller than the startup current for the initial startup, but if the above mentioned time period is longer than a predetermined time period, the air compressor is restarted with the same startup current as the startup current for the initial startup. Accordingly, the air compressor can be securely started up even when the temperature of lubrication oil is low.

In this embodiment, the automatic shutdown function and the automatic restart function have been described, but these functions are not only measures to be employed. For example, there is available any procedure according to which the air compressor is shut down and restarted, after it has initially started up.

Embodiment 4

The 4th embodiment of this invention will now be described.

As described in the 1st embodiment of this invention, when too heavy load is imposed on the permanent magnet synchronous motor, that is, in the state of overload, the actual rotational speed is deviated from the synchronous speed, that is, desynchronization occurs. Once desynchronization occurs, it is difficult to automatically recover the synchronized state. Therefore, desynchronization must be prevented from occurring. Since the detection of desynchronization is difficult, the permanent magnet synchronous motor is shut down for its protection against breakdown when the excessive current is detected which is generated if the load torque becomes too large, that is, in the state of overload.

Here, description will be made of a case where a permanent magnet synchronous motor drives an air compressor. An excessive torque may sometimes be generated in the air compressor due to the compression of lubrication oil, that is, the so-called liquid compression. In such a situation, as described above, the protective function of the motor control system is activated to shut off the power supply to the permanent magnet synchronous motor.

However, the air compressor according to this embodiment is provided with the so-called retry function which automatically tries to restart the air compressor. The retry function is provided in anticipation of the frequent occurrence of disturbances such as temporary failure of startup due to the use of the air compressor in various applications in various unfavorable surroundings. Many disturbances occurring in the air compressor are exceptionally generated depending on particular surroundings of use. Therefore, even when the air compressor cannot be started up due to temporary disturbances, the automatic restart of the air compressor is attempted again.

This embodiment focused on the retry function and aims at prolonging the useful life of IGBTs. How to do this will be explained below. Firstly, under the normal condition, the startup of the permanent magnet synchronous motor is attempted with a small current (e.g. 200 A). Then, if the startup fails due to the insufficiency of the torque of the permanent magnet synchronous motor, an excessive current due to an overload is generated to activate the protective function so that current to the permanent magnet synchronous motor is shut off. At this time, however, the retry function of the air compressor starts its operation to attempt restarting the permanent magnet synchronous motor. This embodiment is characterized in that the restart by the retry function is performed with a preset startup current (e.g. 300 A) that is larger than the startup current for the normal startup.

By performing the startup in this way, the startup current under the normal condition can be lessened so that the useful life of IGBTs can be prolonged. And by increasing the startup current when the retry function starts operating to attempt restarting the air compressor, the air compressor can be started up without fail. Further, according to this embodiment, since the startup current under the normal condition can be lessened, energy conservation with respect to the air compressor can be realized.

The description has hitherto been made by way of embodiment, but this invention is by no means limited to those embodiments described above. It is apparent that numerous modifications and variations are possible without departing from the scope of this invention, which are defined by the attached claims.

The invention claimed is:

1. An air compressor comprising:
a compressor main body including a rotor for compressing air;
a synchronous motor for driving the compressor main body;
a motor control section for controlling a rotational speed of the synchronous motor; and
an oil supply section for supplying oil to the compressed air,
wherein the air compressor includes a temperature sensor for detecting a temperature of the oil;
wherein the motor control section is programmed to perform a positioning operation for causing a DC current to start rotation of the rotor by flowing through a given phase of an armature winding included in the synchronous motor at the time of the startup of the compressor main body;
wherein, in the positioning operation, a magnitude of the DC current is changed so that a first DC current flows in the synchronous motor if a temperature detected by the temperature sensor is equal to or less than a preset temperature and a second DC current flows in the synchronous motor if the temperature detected by the temperature sensor is more than the preset temperature;
wherein, after the positioning operation, a synchronous operation is performed with either the first DC current or the second DC current that flows in the positioning operation until the rotational speed which can stabilize a position-sensor-free control of the synchronous motor is reached; and
wherein the position-sensor-free control is performed after the synchronous operation is performed.

2. The air compressor according to claim 1, wherein the temperature sensor is disposed on a discharging side of the compressor main body.

3. An air compressor comprising:
a compressor main body including a rotor for compressing air;
a synchronous motor for driving the compressor main body;
a motor control section for controlling a rotational speed of the synchronous motor; and an oil supply section for supplying oil to the compressed air, wherein the air compressor includes a temperature sensor for detecting a temperature of the oil;

wherein the motor control section is programmed to perform a positioning operation for conducting a DC current to flow at a certain magnitude and through a given phase of an armature winding included in the synchronous motor at a time of a startup of the compressor main body to start rotation of the rotor;

wherein, in the positioning operation, if a temperature detected by the temperature sensor is higher than a selected value, the DC current flowing in the synchronous motor is set to be smaller than the certain magnitude;

wherein, after the positioning operation, a synchronous operation is performed with the DC current until the rotational speed which can stabilize a position-sensor-free control of the synchronous motor is reached; and wherein the position-sensor-free control is performed after the synchronous operation is performed.

4. The air compressor according to claim 3, wherein the temperature sensor is disposed on a discharging side of the compressor main body.

* * * * *